US012647296B2

(12) United States Patent
Hashimoto

(10) Patent No.: US 12,647,296 B2
(45) Date of Patent: Jun. 2, 2026

(54) APPLIANCE CONTROL SYSTEM, HOME APPLIANCE, AND NOTIFICATION CONTROL METHOD FOR HOME APPLIANCE

(71) Applicant: Mitsubishi Electric Corporation, Tokyo (JP)

(72) Inventor: Kentaro Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 412 days.

(21) Appl. No.: 18/250,818

(22) PCT Filed: Jan. 18, 2021

(86) PCT No.: PCT/JP2021/001490
§ 371 (c)(1),
(2) Date: Apr. 27, 2023

(87) PCT Pub. No.: WO2022/153537
PCT Pub. Date: Jul. 21, 2022

(65) Prior Publication Data
US 2023/0396461 A1 Dec. 7, 2023

(51) Int. Cl.
*H04L 12/28* (2006.01)

(52) U.S. Cl.
CPC .. *H04L 12/2816* (2013.01); *H04L 2012/2841* (2013.01)

(58) Field of Classification Search
CPC ......... H04L 12/2816; H04L 2012/2841; H04L 43/0811; H04L 12/2818; H04L 12/2825;
(Continued)

(56) References Cited

U.S. PATENT DOCUMENTS 11,457,374 B2 9/2022 Jang et al.
2011/0235549 A1* 9/2011 Ahlers ................... H04L 41/08
370/255
(Continued)

FOREIGN PATENT DOCUMENTS

EP 3 088 810 A1 11/2016
EP 3 358 787 A1 8/2018
(Continued)

OTHER PUBLICATIONS

English Translation of "KR-20190035415-A" (Year: 2019).*
(Continued)

*Primary Examiner* — Charles R Kasenge
(74) *Attorney, Agent, or Firm* — Posz Law Group, PLC

(57) ABSTRACT

An appliance control system including a home appliance, a wireless communication unit, and a remote operation unit. The home appliance includes a notification unit providing notification of a state. The wireless communication unit can connect the home appliance to a server device via a wireless network. The remote operation unit enables operation settings of the home appliance and settings of network connection including connection of the wireless communication unit to the wireless network and to the server device. The home appliance includes a control unit performing operation control according to instruction of the operation settings, or controlling the notification unit according to an operating state of the home appliance. The control unit performs control so that notification of information regarding the network connection is provided by using the notification unit between time when a predetermined first condition is satisfied and time when a predetermined second condition is satisfied.

17 Claims, 9 Drawing Sheets

(58) Field of Classification Search
CPC ............... H04L 2012/285; D06F 34/05; G08C
2201/42; G08C 17/02
See application file for complete search history.

(56)                    References Cited

U.S. PATENT DOCUMENTS

| | | | |
|---|---|---|---|
| 2014/0300450 A1 | 10/2014 | Ha et al. | |
| 2016/0295417 A1* | 10/2016 | Fujimoto | ............. H04W 12/02 |
| 2020/0088435 A1 | 3/2020 | Inoue | |
| 2020/0159399 A1* | 5/2020 | Sundermeyer | ........ H04L 12/283 |
| 2021/0153283 A1* | 5/2021 | Kim | ..................... H04W 60/00 |
| 2021/0262685 A1 | 8/2021 | Fukushima et al. | |
| 2021/0368366 A1 | 11/2021 | Jang et al. | |

FOREIGN PATENT DOCUMENTS

| | | | | |
|---|---|---|---|---|
| EP | 3703426 A1 | 9/2020 | | |
| JP | 2006-173974 A | 6/2006 | | |
| JP | 2014-200692 A | 10/2014 | | |
| JP | 2020-027954 A | 2/2020 | | |
| KR | 20190035415 A | * | 4/2019 | .......... H04L 67/125 |

| | | | |
|---|---|---|---|
| WO | 2018/220898 A1 | 12/2018 | |
| WO | 2019/082336 A1 | 5/2019 | |
| WO | 2020/189805 A1 | 9/2020 | |

OTHER PUBLICATIONS

International Search Report of the International Searching authority mailed Apr. 13, 2021 in corresponding International Application No. PCT/JP2021/001490 (and English translation).
Office Action mailed Mar. 26, 2024 in corresponding Australian patent application No. 2021419917.
Samsung, "E-Manual", Jan. 1, 2013, XP055440724, Retrieved from the Internet: URL:https://support-us.samsung.com/nas/storage/201306131733051Astorage_attachmentAF6300_-_6350_e-Manual.pdf [retrieved on Jan. 15, 2018].
Office Action mailed Feb. 12, 2024 in corresponding European Patent Application No. 21919430.5.
Office Action mailed on Dec. 17, 2025 for the corresponding European patent application No. 21919430.5.
Office Action mailed on Nov. 29, 2025 for the corresponding Chinese patent application No. 202180090405.7 (and English machine translation).

* cited by examiner

FIG.3

| STATE | LAMP OR BEEPING SOUND | NOTIFICATION CONTENT |
|---|---|---|
| COOLING | OPERATION LAMP | BLUE |
| HEATING | | ORANGE |
| DRY | | GREEN |
| FAN ONLY | | WHITE |
| OPERATION IS OFF | | TURNED OFF |
| MONITORING | | ALTERNATE RED AND WHITE |
| PLEASANT SLEEP IS SET | | DARK (COLOR DEPENDS ON OPERATION MODE) |
| CLEANING IS IN OPERATION | CLEAN LAMP | TURNED ON |
| CLEANING IS NOT IN OPERATION | | TURNED OFF |
| NORMAL | BEEPING SOUND | NO SOUND |
| RECEPTION OF OPERATION FROM REMOTE CONTROLLER | | TWO CONSECUTIVE SHORT BLIPS: BLIP-BLIP |
| ERRONEOUS OPERATION FROM REMOTE CONTROLLER | | THREE CONSECUTIVE SHORT BLIPS: BLIP-BLIP-BLIP |

FIG.4

| STATE | LAMP | BEEPING SOUND |
|---|---|---|
| ATTEMPTING TO CONNECT TO ROUTER (S211) | TWO FLASHES WITH 0.5-SECOND INTERVAL | REPETITION OF TWO BLIPS: BLIP, BLIP, AND BLIP, BLIP |
| FAILED CONNECTION TO ROUTER (S212) | TURNED OFF | FIVE BEEPS: BEEP, BEEP, BEEP, BEEP, BEEP |
| SUCCESSFUL CONNECTION TO ROUTER (S213) | TURNED ON | FIVE-SECOND BEEP |
| ATTEMPTING TO CONNECT TO SERVER (S221) | THREE FLASHES WITH 0.5-SECOND INTERVAL | REPETITION OF THREE CONSECUTIVE SHORT BLIPS: BLIP-BLIP-BLIP, AND BLIP-BLIP-BLIP |
| FAILED CONNECTION TO SERVER (S222) | TURNED OFF | FIVE BEEPS: BEEP, BEEP, BEEP, BEEP, BEEP |
| COMPLETED CONNECTION TO SERVER (S223) | TURNED ON | FIVE-SECOND BEEP |

FIG.7

| STATE | LAMP | BEEPING SOUND |
|---|---|---|
| CONNECTED TO SERVER (S310) | FLASH WITH ONE-SECOND INTERVAL | BEEP |
| APPLIANCE ANOMALY (S320) | ONE FLASH WITH 0.5-SECOND INTERVAL | REPETITION OF ONE BLIP: BLIP, AND BLIP |
| FAILED CONNECTION TO ROUTER (S330) | TWO FLASHES WITH 0.5-SECOND INTERVAL | REPETITION OF TWO BLIPS: BLIP, BLIP, AND BLIP, BLIP |
| FAILED DNS RESOLUTION (S340) | THREE FLASHES WITH 0.5-SECOND INTERVAL | REPETITION OF THREE BLIPS: BLIP, BLIP, BLIP, AND BLIP, BLIP, BLIP |
| ... | ... | ... |

14

APPLIANCE CONTROL SYSTEM, HOME APPLIANCE, AND NOTIFICATION CONTROL METHOD FOR HOME APPLIANCE

CROSS REFERENCE TO RELATED APPLICATION

This application is a U.S. National Stage Application of International Patent No. PCT/JP2021/001490 filed on Jan. 18, 2021, the disclosure of which is incorporated herein by reference.

TECHNICAL FIELD

The present disclosure relates to an appliance control system that provides a notification of an operating state of a home appliance and a connection state thereof to a network, the home appliance, and a notification control method for the home appliance.

BACKGROUND

In recent years, there have been increasing cases where home appliances are connected to the Internet. Regarding a home appliance that does not have a communication function, connection to a wireless communication adapter having a wireless communication function enables such a home appliance to be connected to the Internet via a router constituting a local area network (LAN) with the wireless communication adapter. The wireless communication adapter includes a lamp that provides a notification of a radio condition. In a case where a trouble occurs in network connection and the network connection needs to be reset, if the wireless communication adapter is installed at a position where the lamp cannot be easily checked, there is a possibility that the lamp of the wireless communication adapter cannot be checked, which is inconvenient.

Patent Literature 1 discloses a technique in which a wireless communication adapter provides, to a terminal device including a display capable of communicating with the wireless communication adapter, connection information indicating whether the wireless communication adapter can communicate with a router.

PATENT LITERATURE

Patent Literature 1: Japanese Patent Application Laid-open No. 2020-027954

With the technique described in Patent Literature 1, however, although it is possible, when a home appliance and the router are not correctly connected, to notify a user who possesses the terminal device including the display of the connection information, it is not possible to notify a user who does not possess such a terminal device of the connection information. In addition, although a remote controller is provided in the home appliance, since communication between such a remote controller and a corresponding home appliance is normally unidirectional, the remote controller cannot be notified of the connection information. Moreover, not only a home appliance to which a wireless communication adapter is externally attached, but also a home appliance incorporating a wireless communication module therein has a similar problem. Therefore, there is a demand for a technique capable of notifying a user, without changing a configuration of an existing home appliance, of connection information of a wireless communication adapter externally attached to a home appliance or a wireless communication module incorporated in a home appliance.

SUMMARY

The present disclosure has been made in view of the above, and an object thereof is to provide an appliance control system that, in a home appliance connectable to a server device via a wireless network, can notify a user, without changing a configuration of an existing home appliance, of information regarding connection to the wireless network by wireless communication and connection to the server device via the wireless network.

In order to solve the above-described problem and achieve the object, an appliance control system according to the present disclosure includes a home appliance, a wireless communication unit, and a remote operation unit. The home appliance includes a notification unit that provides a notification of a state by display or annunciating. The wireless communication unit enables the home appliance to be connected to a server device via a wireless network. The remote operation unit enables operation settings of the home appliance and settings of network connection including connection of the wireless communication unit to the wireless network and to the server device to be performed. The home appliance includes a control unit that performs operation control in accordance with an instruction of the operation settings from the remote operation unit, or controls the notification unit in accordance with an operating state of the home appliance. The control unit performs control so that a notification of information regarding the network connection is provided by using the notification unit between a time when a predetermined first condition is satisfied and a time when a predetermined second condition is satisfied.

An appliance control system according to the present disclosure achieves an effect that, in a home appliance connectable to a server device via a wireless network, it is possible to notify a user, without changing a configuration of an existing home appliance, of information regarding connection to the wireless network by wireless communication and connection to the server device via the wireless network.

BRIEF DESCRIPTION OF DRAWINGS

FIG. 3 is a diagram illustrating an example of operation notification control information of a lamp or a buzzer of the home appliance that does not have a wireless communication function.

FIG. 4 is a diagram illustrating an example of connection notification control information of the lamp or the buzzer used in a connection mode in the home appliance of the appliance control system according to the first embodiment.

FIG. 7 is a diagram illustrating an example of state check notification control information of the lamp or the buzzer used in a connection state check mode in the home appliance of the appliance control system according to the second embodiment.

DETAILED DESCRIPTION

Hereinafter, an appliance control system, a home appliance, and a notification control method for the home appliance according to each embodiment of the present disclosure will be described in detail with reference to the drawings.

First Embodiment

Figure 1:
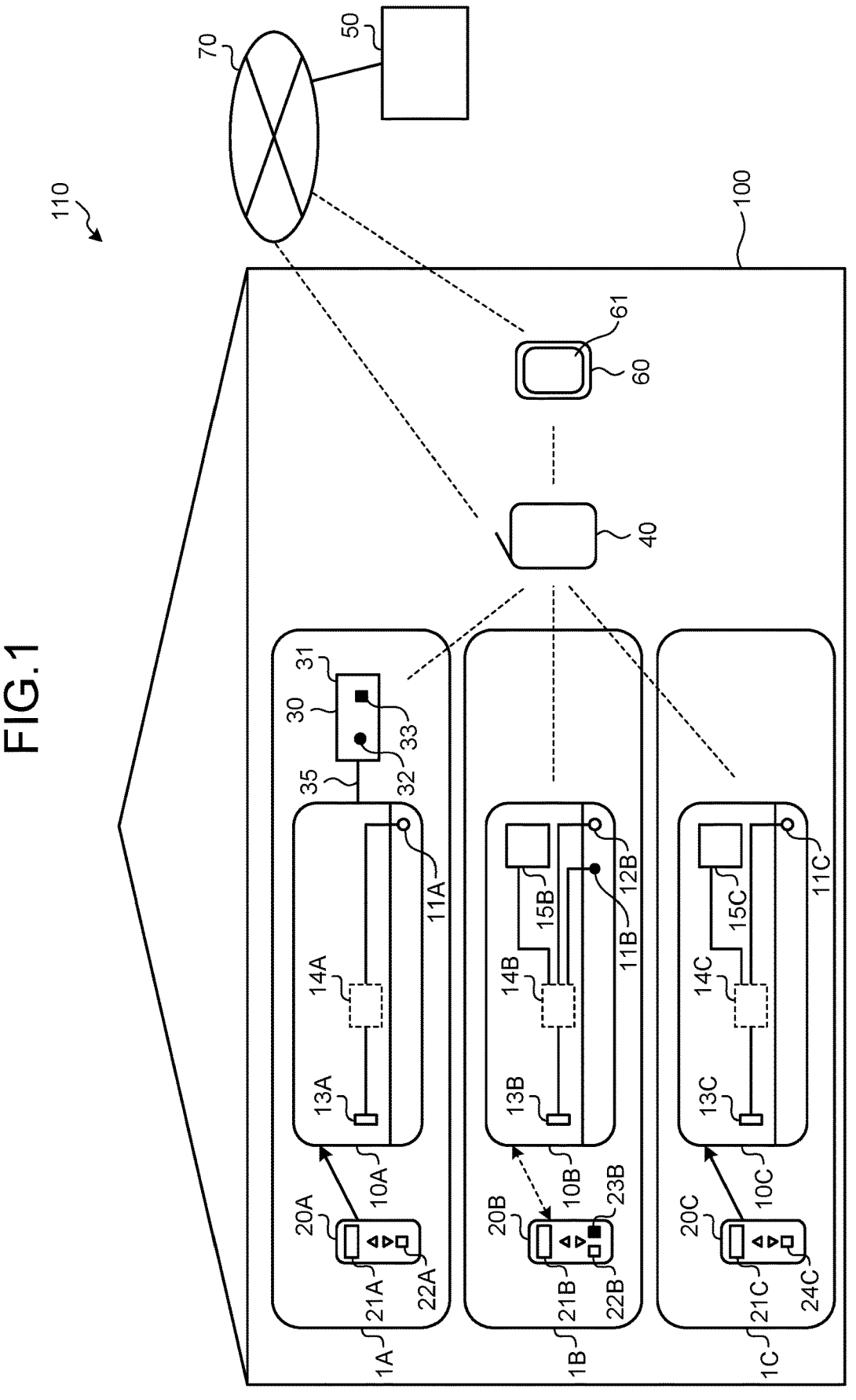
FIG. 1 is a diagram illustrating an example of a configuration of a management system including appliance control systems according to a first embodiment.

First, an appliance control system according to a first embodiment will be described. FIG. 1 is a diagram illustrating an example of a configuration of a management system including appliance control systems according to the first embodiment. Hereinafter, a case where a home appliance is an air conditioner will be described as an example.

A management system 110 includes appliance control systems 1A, 1B, and 1C, a router 40, a server device 50, and an information terminal 60. In one example, the appliance control systems 1A, 1B, and 1C are provided in an architectural structure 100 in which home appliances 10B, and 10C are installed. Examples of the architectural structure 100 include a detached house, an apartment or condominium, a building, and a commercial facility.

The appliance control system 1A includes the home appliance 10A, a remote controller 20A, and a wireless communication adapter 30. The remote controller corresponds to a remote operation unit.

The home appliance 10A includes a lamp 11A, a buzzer 13A, and a control unit 14A. The lamp 11A performs control so that a visual notification of a state of the home appliance 10A is provided in accordance with an instruction from the control unit 14A. An example of the lamp 11A is a light emitting diode (LED). In one example, the lamp 11A provides a notification of the state of the home appliance 10A by combining a color to be displayed, a blinking pattern, and the like. When receiving an operation from the remote controller 20A, the buzzer 13A annunciates that the operation from the remote controller has been received in accordance with an instruction from the control unit 14A. What is meant by "annunciate" used herein is to provide an auditory notification. The lamp 11A and the buzzer 13A correspond to a notification unit that provides a notification of a state by display or annunciating.

The control unit 14A controls the operation of the home appliance 10A in accordance with a setting instruction from the remote controller 20A. In addition, the control unit 14A is electrically connected to the lamp 11A and the buzzer 13A, and performs notification control in the lamp 11A or the buzzer 13A in accordance with an operating state of the home appliance 10A. The control unit 14A controls the lamp 11A or the buzzer 13A with reference to operation notification control information in which the operating state of the home appliance 10A and the content of control of the lamp 11A or the buzzer 13A are associated with each other.

The remote controller 20A is a user interface for the home appliance 10A that enables settings of the operation of the home appliance 10A to be performed. The remote controller 20A includes a display unit 21A indicating a setting state of the home appliance 10A and a button 22A for changing the settings of the home appliance 10A. In general, the remote controller 20A can communicate with the control unit 14A of the home appliance 10A by unidirectional communication using electromagnetic waves such as infrared rays. The remote controller 20A need not include the display unit 21A.

The wireless communication adapter 30 is a device that is connected to the home appliance 10A via a cable 35 and can connect the home appliance 10A to the server device via a wireless network. The wireless communication adapter 30 corresponds to a wireless communication unit. The wireless communication adapter 30 includes, in a housing 31, a button 32 for performing wireless settings and a lamp 33 that displays a wireless connection state. When the button 32 is pressed, the wireless communication adapter 30 performs a process of establishing wireless communication with the router 40 constituting a wireless LAN which is a wireless network.

In one example, the appliance control system 1A including the home appliance 10A, the remote controller and the wireless communication adapter 30 is provided in one room in the architectural structure 100. The home appliance 10A of the appliance control system 1A does not include a lamp that displays a wireless connection state to the router 40 and a connection state to the server device 50. The remote controller 20A does not include a wireless setting unit for the wireless communication adapter 30. Therefore, a user of the home appliance 10A performs wireless communication settings by the button 32 of the wireless communication adapter 30 connected to the home appliance 10A, and checks the wireless connection state to the router 40 and the connection state to the server device by the lamp 33 of the wireless communication adapter 30. The term "user" used herein means a person who uses the appliance control systems 1A, 1B, and 1C, and also includes a contractor who temporarily uses the appliance control systems 1A, 1B, and 1C when performing construction thereof in the architectural structure 100.

The appliance control system 1B includes the home appliance 10B and a remote controller 20B.

The home appliance 10B includes a lamp 11B, a lamp 12B, a buzzer 13B, a control unit 14B, and a wireless communication module 15B. Since the lamp 11B and the buzzer 13B have functions similar to those of the lamp 11A and the buzzer 13A of the home appliance 10A, respectively, descriptions thereof will be omitted. The lamp 12B provides a visual notification of a network connection state, which is a state related to network connection by the wireless communication module 15B in accordance with an instruction from the control unit 14B. The network connection state is information regarding network connection including a wireless connection state to the router 40 and a connection state to the server device 50 via Internet 70. An example of the lamp 12B is an LED. In one example, the lamp 12B indicates a state of the home appliance 10B by combining a color to be displayed, a blinking pattern, and the like.

The control unit 14B performs operation control of the home appliance 10B in accordance with a setting instruction from the remote controller 20B and network connection control. In addition, the control unit 14B is electrically connected to the lamps 11B and 12B and the buzzer 13B, performs notification control in the lamp 11B or the buzzer 13B in accordance with an operating state of the home appliance 10B, and performs notification control by the lamp 12B or the buzzer 13B in accordance with the network connection state. The control unit 14B controls the lamp 11B or 12B or the buzzer 13B with reference to operation notification control information in which the operating state of the home appliance 10B and the content of control of the lamp 11B or 12B or the buzzer 13B are associated with each other. In addition, the control unit 14B controls the lamp 11B or 12B or the buzzer 13B with reference to connection notification control information in which a network connection state of the home appliance 10B and the content of control of the lamp 11B or 12B or the buzzer 13B are associated with each other.

The wireless communication module 15B has a wireless communication function. The wireless communication module 15B enables the home appliance 10B to be connected to the server device 50 via the wireless network. The wireless communication module 15B corresponds to a wireless communication unit.

The remote controller 20B is a user interface for the home appliance 10B that enables settings of the operation of the home appliance 10B, network connection settings of the wireless communication module 15B, and display of the network connection state of the wireless communication module 15B to be performed. The remote controller 20B includes a display unit 21B that indicates a state of operation settings of the home appliance 10B and a network connection state of the wireless communication module 15B, a button 22B for changing the operation settings of the home appliance 10B, and a button 23B for performing the network connection settings. The remote controller 20B can communicate with the home appliance 10B by bilateral communication to acquire information from the home appliance 10B, specifically, to acquire the network connection state.

In one example, the appliance control system 1B including the home appliance 10B and the remote controller 20B is provided in one room other than the room in which the appliance control system 1A is provided in the architectural structure 100. The home appliance 10B of the appliance control system 1B includes the lamps 11B and 12B that display a wireless connection state to the router 40 and a connection state to the server device 50. The remote controller 20B includes the button 23B for performing the network connection settings for the wireless communication module 15B. Therefore, the user of the home appliance 10B can perform the network connection settings by the button 23B of the remote controller 20B, and check the wireless connection state to the router 40 and the connection state to the server device 50 by the display unit 21B of the remote controller 20B.

The appliance control system 1C includes the home appliance 10C and a remote controller 20C.

The home appliance 10C includes a lamp 11C, a buzzer 13C, a control unit 14C, and a wireless communication module 15C. Since the buzzer 13C has a function similar to that of the buzzer 13A of the home appliance 10A, and the wireless communication module 15C has a function similar to that of the wireless communication module 15B, descriptions thereof will be omitted. The lamp 11C provides a visual notification of a state of the home appliance 10C and the network connection state of the wireless communication module 15C in accordance with an instruction from the control unit 14C. An example of the lamp 11C is an LED. In one example, the lamp 11C indicates the state of the home appliance 10C by combining a color to be displayed, a blinking pattern, and the like.

The control unit 14C performs operation control of the home appliance 10C in accordance with a setting instruction from the remote controller 20C and network connection control. In addition, the control unit 14C is electrically connected to the lamp 11C and the buzzer 13C, performs notification control in the lamp 11C or the buzzer 13C in accordance with an operating state of the home appliance 10C, and performs notification control by the lamp 11C or the buzzer 13C in accordance with the network connection state. The control unit 14C controls the lamp 11C or the buzzer 13C with reference to operation notification control information in which the operating state of the home appliance 10C and the content of control of the lamp 11C or the buzzer 13C are associated with each other. In addition, the control unit 14C controls the lamp 11C or the buzzer 13C with reference to connection notification control information in which a network connection state of the home appliance 10C and the content of control of the lamp 11C or the buzzer 13C are associated with each other.

The remote controller 20C is a user interface for the home appliance 10C that enables settings of the operation of the home appliance 10C and network connection settings of the wireless communication module 15C to be performed. The remote controller 20C includes a display unit 21C that indicates a state of operation settings of the home appliance 10C and a button 24C for changing the operation settings and the network connection settings of the home appliance 10C. In general, the remote controller can communicate with the control unit 14C of the home appliance 10C by unidirectional communication using electromagnetic waves such as infrared rays. The remote controller 20C need not include the display unit 21C. As described above, the configurations of the home appliance and the remote controller 20C of the appliance control system 1C are similar to those of the home appliance 10A and the remote controller 20A of the appliance control system 1A, but the function of the control unit 14C of the home appliance 10C and the function of the button 24C of the remote controller 20C are changed by software.

In one example, the appliance control system 1C including the home appliance 10C and the remote controller 20C is provided in one room other than the room in which the appliance control system 1A or 1B is provided in the architectural structure 100. In the appliance control system 1C, the home appliance 10C includes the lamp 11C that displays the operating state of the home appliance 10C and the connection state of the wireless communication module 15C to the network. The remote controller 20C includes button 24C for performing the operation settings of the home appliance 10C and the network connection settings of the wireless communication module 15C. Therefore, the user of the home appliance 10C can perform the network connection settings by the button 24C of the remote controller 20C, and check the network connection state by the lamp 11C of the home appliance 10C.

The router 40 constitutes a wireless LAN which is a wireless network with the wireless communication adapter 30 of the appliance control system 1A, the wireless communication module 15B of the home appliance 10B of the appliance control system 1B, and the wireless communication module 15C of the home appliance 10C of the appliance control system 1C. The router 40 connects the wireless LAN to the Internet 70. Consequently, it is possible to access the Internet 70 by the wireless communication adapter 30 of the appliance control system 1A, the wireless communication module 15B of the home appliance 10B of the appliance control system 1B, and the wireless communication module of the home appliance 10C of the appliance control system 1C.

The server device 50 is connected to the Internet collects information regarding the home appliances 10A, and 10C, and performs monitoring and the like of the home appliances 10A, 10B, and 10C. The server device 50 provides the user and the like of the home appliances 10A, and 10C with the information regarding the home appliances 10A, 10B, and 10C, and controls the home appliances 10A, 10B, and 10C in accordance with an instruction from the information terminal 60 of the users and the like of the home appliances 10A, 10B, and 10C. The server device 50 may be a cloud server or an on-premises server.

The information terminal 60 is an information processing apparatus capable of acquiring information regarding the home appliances 10A, 10B, and 10C, and setting operations of the home appliances 10A, 10B, and 10C. The information terminal 60 includes a wireless communication module (not illustrated) and a display unit 61. Examples of the information terminal 60 include a personal computer, a smartphone, and a tablet terminal. In a case where the information terminal 60 is present within a range in which the information terminal 60 can be wirelessly connected to the router 40, the information terminal 60 can communicate with the home appliances 10A, and 10C directly via the router 40 in the same wireless LAN as that including the home appliances 10A, and 10C. Alternatively, the information terminal 60 can communicate with the home appliances 10A, 10B, and 10C via the server device 50 connected to the Internet 70. In the case of communication is performed directly via the router 40 in the same wireless LAN as that including the home appliances 10A, 10B, and 10C, the server device 50 need not be present.

In the appliance control system 1A, expenses are incurred for the housing 31 and the cable 35 of the wireless communication adapter 30, and in a case where the home appliance 10A is one installed at a high place such as an air conditioner, it takes time and effort to perform the settings of the network connection and to check the state thereof. In addition, since the wireless communication adapter 30 is provided separately from the home appliance the appearance is also affected. Therefore, although the appliance control system 1A is a useful system in a case where a wireless communication function is added later, the appliance control system 1A is not a preferable system for a home appliance having a wireless function as a standard.

Since the appliance control system 1B does not include the wireless communication adapter 30, the expenses for the housing 31 and the cable 35 of the wireless communication adapter 30 can be saved and the appearance is not affected as compared with the appliance control system 1A. However, since the home appliance 10B further includes the lamp 12B that indicates the network connection state as compared with the home appliance 10A of the appliance control system 1A, and the remote controller 20B further includes the button 23B for performing the network connection settings as compared with the remote controller 20A of the appliance control system 1A, the cost increases as compared with the appliance control system 1A. That is, it is purely disadvantageous for a user who does not desire the wireless communication function.

In the appliance control system 1C, the button 22A of the remote controller 20A of the appliance control system 1A is changed, by software, to the button 24C for performing the operation settings and the network connection settings of the home appliance 10C. By changing the software, the lamp 11A of the home appliance 10A of the appliance control system 1A is changed so as to display the operating state and the network connection state of the home appliance 10C. By changing the software, the buzzer 13A of the home appliance 10A of the appliance control system 1A is changed so as to receive an operation from the remote controller 20C and provide a notification of the network connection state. As described above, with the same configuration as the appliance control system 1A and the function changed by changing the software, cost can be prevented from increasing as compared with the case of the appliance control system 1A.

However, in the appliance control system 1C, when a notification of the settings and state of the operation of the home appliance 10C and a notification of the settings and state of the network connection thereof are provided, there arises a case where functions conflict with each other. In that case, the user may be confused because the user cannot determine whether the content of the notification provided by the lamp 11C or the buzzer 13C relates to the operating state of the home appliance 10C or relates to the network connection state thereof. In particular, regarding the settings and state of the network connection, there are various types of notification contents. As in a case where the wireless communication module 15C is anomalous, a case where pairing with the router 40 fails, a case where an internet protocol (IP) address cannot be acquired, a case where a domain name system (DNS) cannot be resolved, and a case where the server device 50 is down, there are many contents that require notification. The settings and state of the network connection are important information in an anomalous state, and details are required immediately. Therefore, it is difficult to cut down these notification contents from the notification using the lamp 11C or the buzzer 13C. However, these notification contents are not constantly necessary in a normal state.

Therefore, in the first embodiment, the control unit 14C of the home appliance 10C performs control so that a notification of information regarding network connection by the wireless communication module 15C is provided by using the lamp 11C or the buzzer 13C in a predetermined period. The content of the notification provided by using the lamp 11C or the buzzer 13C in this period is not information regarding the operating state of the home appliance 10C but information regarding the network connection state. As a condition for the start of the predetermined period, a time when the wireless communication module 15C starts pairing can be set. In addition, as a condition for the end of the predetermined period, a time when the connection to the server device 50 is completed or fails, or a time when the connection to the router 40 fails can be set. The condition for the start of the predetermined period corresponds to a first condition, and a condition for the end of the predetermined period corresponds to a second condition.

Specifically, a normal mode in which the lamp 11C and the buzzer 13C provide a notification of the operating state of the home appliance 10C and a connection mode in which the lamp 11C and the buzzer 13C provide a notification of the network connection state are provided. The normal mode is set in the normal state, but is switched to the connection mode when the condition for the start of the predetermined period is satisfied. Thereafter, when the condition for the end of the predetermined period is satisfied, the connection mode is switched to the normal mode.

In the normal mode, the notification by the lamp 11C or the buzzer 13C indicates the state of the operation of the home appliance 10C. That is, the control unit 14C provides the notification using the lamp 11C or the buzzer 13C corresponding to the state of the operation of the home appliance 10C with reference to the operation notification control information. At that time, the wireless communication module 15C is unconnected to the wireless LAN or is connected to the server device 50. The normal mode corresponds to a first mode.

In the connection mode, the notification by the lamp 11C or the buzzer 13C indicates the network connection state of the wireless communication module 15C. That is, the control unit 14C provides the notification using the lamp 11C or the buzzer 13C corresponding to the network connection state with reference to the connection notification control information. The connection mode corresponds to a second mode.

Figure 2:
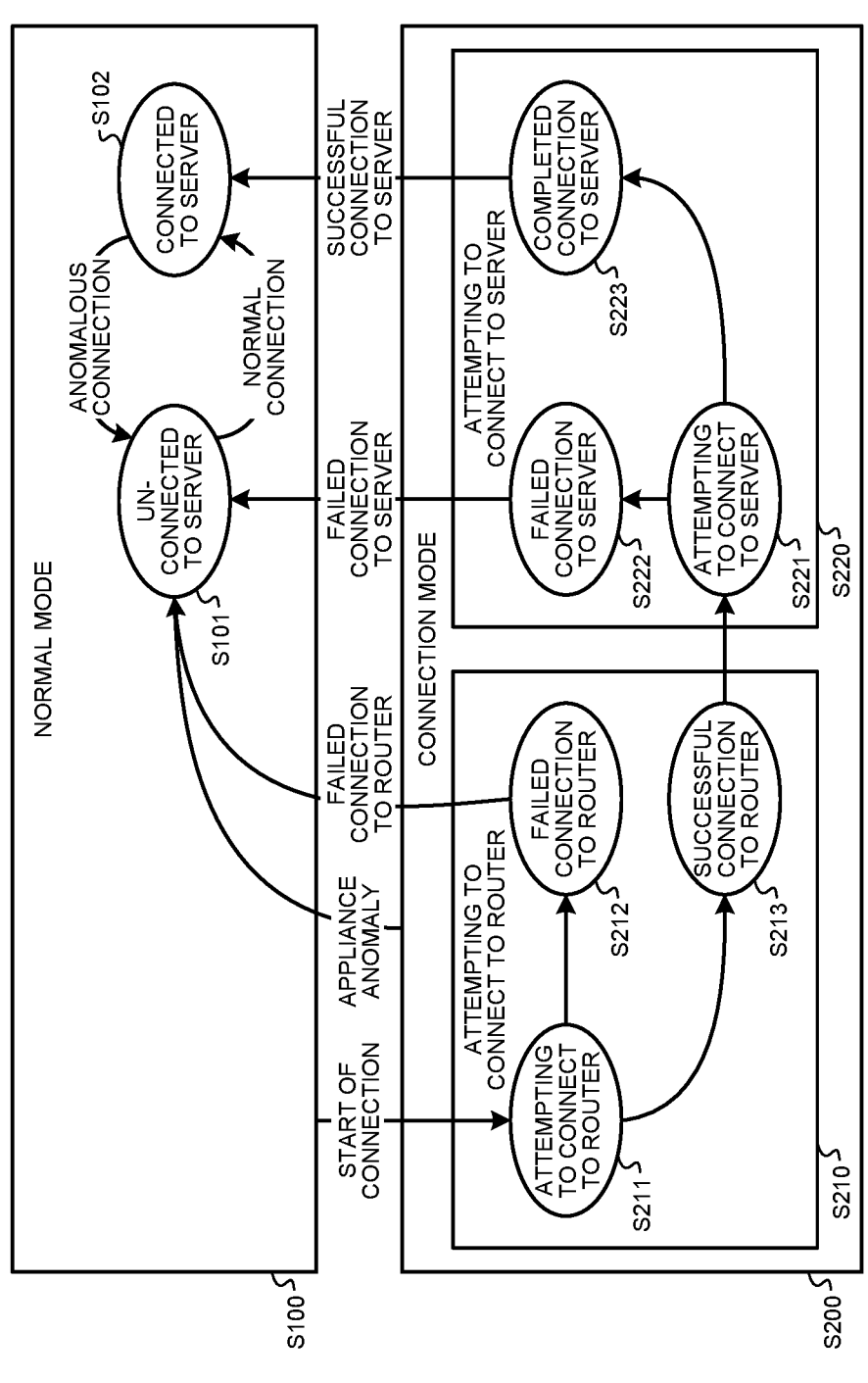
FIG. 2 is a diagram illustrating an example of state transition of a home appliance used in the appliance control system according to the first embodiment.

Next, state transition in the normal mode and the connection mode will be described. FIG. 2 is a diagram illustrating an example of state transition of the home appliance used in the appliance control system according to the first embodiment.

As illustrated in FIG. 2, in the home appliance of the first embodiment, the normal mode (step S100) and the connection mode (step S200) are provided for the notification by the lamp 11C or the buzzer 13C.

The normal mode (step S100) includes a state of being unconnected to the server (step S101) in which the wireless communication module 15C is not connected to the server device 50 and a state of being connected to the server (step S102) in which the wireless communication module 15C is connected to the server device 50. In the normal mode (step S100), the notification by the lamp 11C or the buzzer 13C is a notification regarding the operating state of the home appliance 10C.

Next, a flow from the state of the normal mode (step S100) to the state of being connected to the server (step S102) will be described. When the user presses the button 24C of the remote controller 20C in the state of the normal mode (step S100), the state transitions to the state of the connection mode (step S200). That is, when the button 24C is pressed, pairing with the router 40 is started. The button 24C is a button for performing the operation settings and the network connection settings of the home appliance 10C in the remote controller 20C, and is a button that is included also in a model that does not include the wireless communication module 15C. Therefore, the transition to the connection mode (step S200) can be realized by continuously pressing the button 24C for a predetermined time or longer, for example, for five seconds, or, in a case where there are a plurality of buttons 24C, by simultaneously pressing the plurality of buttons 24C of a predetermined combination.

There are roughly two states in the connection mode (step S200). That is, the connection mode (step S200) includes a state of attempting to connect to the router 40 (step S210) and a state of attempting to connect to the server (step S220).

When the mode transitions to the connection mode (step S200), first, the wireless communication module 15C transitions to a state of attempting to connect to the router (step S211), which is a process of establishing wireless connection to the router 40. At that time, in one example, the user presses a Wi-Fi Protected Setup (WPS) button provided on the router 40. Thereafter, when the wireless communication module 15C succeeds in connection to the router 40, the state transitions to a state of successful connection to the router (step S213).

After the state of successful connection to the router (step S213), the state transitions to a state of attempting to connect to the server (step S221) in which the wireless communication module 15C attempts to connect to the server device 50 via the router 40. When the connection between the wireless communication module 15C of the home appliance 10C and the server device 50 is completed, the state transitions to a state of completed connection to the server (step S223), and then transitions to the state of being connected to the server (step S102) in the normal mode (step S100).

Next, a case where network connection fails will be described. In a case where the wireless communication module 15C fails in wireless connection to the router 40 in the state of attempting to connect to the router (step S211), the state transitions to a state of failed connection to the router (step S212). As an example of the case where the wireless communication module 15C fails in wireless connection to the router 40, there is a failure of WPS. Thereafter, the state transitions to the state of being unconnected to the server (step S101) in the normal mode (step S100).

In a case where the wireless communication module 15C fails in wireless connection to the server device 50 in the state of attempting to connect to the server (step S221), the state transitions to a state of failed connection to the server (step S222). As an example of the case where the wireless communication module 15C fails in connection to the server device 50, there is a case where the Internet is not reached. Thereafter, the state transitions to the state of being unconnected to the server (step S101) in the normal mode (step S100).

In a case where the wireless communication module 15C has a hardware failure, for example, wireless communication cannot be performed, in the state of the connection mode (step S200), the state transitions to the state of being unconnected to the server (step S101) in the normal mode (step S100).

For example, suppose that, in attempting to connect to the server in step S221, a wide area network (WAN) cable of the router 40 is unplugged and connection to the Internet 70 is disconnected. In that case, the state transitions to the state of failed connection to the server (step S222) in which it is not possible to access the server device 50. Thereafter, the state transitions from the state of failed connection to the server (step S222) to the state of being unconnected to the server (step S101) in the normal mode (step S100). In a case where the WAN cable of the router 40 is inserted into the router 40 and the connection to the Internet 70 is restored in that state, the state may transition to the state of being connected to the server (step S102). On the other hand, when the WAN cable is unplugged in the state of being connected to the server (step S102), the state transitions to the state of being unconnected to the server (step S101) in the normal mode (step S100).

In the network connection settings to the router there occur states in which connection is not possible due to various factors such as a failure of the router 40 or maintenance of the server device 50. Therefore, if there is no notification of each of the states, a situation arises in which the user does not know where there was a failure at the time of the network connection settings and cannot cope with the failure.

FIG. 3 is a diagram illustrating an example of operation notification control information of the lamp or the buzzer of the home appliance that does not have a wireless communication function. As illustrated in FIG. 3, the operation notification control information is information defining how the lamp 11C or the buzzer 13C is operated with respect to the operating state of the home appliance 10C. Here, a case is illustrated where the lamp 11C includes an operation lamp indicating an operation state of the home appliance 10C and a clean lamp indicating a cleaning state. The operation notification control information in FIG. 3 includes items of "state", "lamp or beeping sound", and "notification content".

The item of "state" indicates an operating state of the home appliance 10C. The item of "lamp or beeping sound" indicates the lamp 11C or beeping sound used in notification when the operating state of the home appliance 10C is defined in the "state". The item of "notification content" indicates how the operation lamp, the clean lamp, or the buzzer 13C is controlled. For example, when the "state" indicates cooling, the operation lamp is lit in blue. When the "state" indicates that cleaning is in operation, the clean lamp is turned on. When the "state" indicates reception of operation from the remote controller, the buzzer 13C emits beeping sound including two consecutive short blips: blip-blip. As described above, in a case where the contents of the notification for the network connection state are further added in a state where many contents of the notification for the operating state of the home appliance 10C are set, the contents conflict with existing notification contents, and the network connection state cannot be realized by the notification by the lamp 11C or the buzzer 13C, or becomes difficult for the user to understand.

In the first embodiment, as described above, the content of the notification provided by using the lamp 11C or the buzzer 13C in the normal mode is information regarding the operating state of the home appliance 10C, and a notification of the information regarding the network connection state is not provided. In addition, the content of the notification provided by using the lamp 11C or the buzzer 13C in the connection mode is information regarding the network connection state, and a notification of information regarding the operating state of the home appliance 10C is not provided. As described above, the notification pattern of the operating state of the home appliance 10C and the notification pattern of the network connection state thereof are separated depending on the mode, that is, the period. In some cases, the pattern for the normal mode and the pattern for the connection mode can be combined.

FIG. 4 is a diagram illustrating an example of connection notification control information of the lamp or the buzzer used in the connection mode in the home appliance of the appliance control system according to the first embodiment. As illustrated in FIG. 4, the connection notification control information is information defining how the lamp 11C or the buzzer 13C is operated with respect to the network connection state of the wireless communication module 15C. In FIG. 4, an item of "state" indicates each of the states in the connection mode of step S200 of FIG. 2, an item of "lamp" indicates how the lamp 11C of the home appliance 10C is controlled, and an item of "beeping sound" indicates how the buzzer 13C of the home appliance 10C is controlled.

As described above, the control unit 14C switches the mode from the normal mode to the connection mode in a case where the condition for the start of the predetermined period is satisfied. Therefore, in a state where the condition for the start of the predetermined period is not satisfied, the mode is the normal mode, and the control unit 14C controls the lamp 11C or the buzzer 13C on the basis of the operation notification control information illustrated in FIG. 3. In addition, after the condition for the start of the predetermined period is satisfied, the mode is switched to the connection mode, and the control unit 14C controls the lamp 11C or the buzzer 13C on the basis of the connection notification control information illustrated in FIG. 4. In one example, by the user operating the button 24C of the remote controller 20C when performing switching from the normal mode to the connection mode, the condition for the start of the predetermined period is satisfied. Since the user can recognize whether the switching from the normal mode to the connection mode has been performed, the user can determine a difference in meaning of the notifications using the lamp 11C or the buzzer 13C. By combining the lamp 11C and the buzzer 13C as illustrated in FIG. 4, the connection notification control information can be a notification in contrast to that in the case of the operation notification control information in FIG. 3 in which the lamp 11C and the buzzer 13C are not combined. As a result, it is possible to more clearly determine the network connection state in the connection mode.

In the above description, the case has been described where regarding the appliance control system 1C of FIG. 1, the normal mode and the connection mode are provided and separated depending on conditions. However, also regarding the appliance control systems 1A and 1B of FIG. 1, the normal mode and the connection mode can be provided and separated depending on conditions. In the case of the appliance control system 1A, it is only required that the wireless communication module 15C be replaced with the wireless communication adapter 30. In addition, in the case of the appliance control system 1A, similarly to the case of the appliance control system 1C described above, the control unit 14A controls the lamp 11A or the buzzer 13A on the basis of the operation notification control information in FIG. 3 in the case of the normal mode, and on the basis of the connection notification control information in FIG. 4 in the case of the connection mode. In a case of a home appliance that does not include the wireless communication module 15B or or a home appliance that does not include the wireless communication module 15B or 15C and to which the wireless communication adapter 30 is not attached, the normal mode (step S100) includes only the state of being unconnected to the server (step S101).

In the case of the appliance control system 1B, the lamp 11B or the buzzer 13B is controlled on the basis of the operation notification control information in FIG. 3 in the case of the normal mode, and the lamp 12B or the buzzer 13B is controlled on the basis of the connection notification control information in FIG. 4 in the case of the connection mode.

In the above description, an example has been described in which the normal mode is switched to the connection mode when the wireless communication module 15B or 15C or the wireless communication adapter 30 starts pairing with the router 40 as the condition for the start of the predetermined period, but the mode may be switched to the connection mode under other conditions. In one example, the condition for the start of the predetermined period under which switching to the connection mode is performed may be a time when the clean lamp is not used, a time when the operation is stopped, or the like. This makes it easier for the user to understand.

Figure 5:
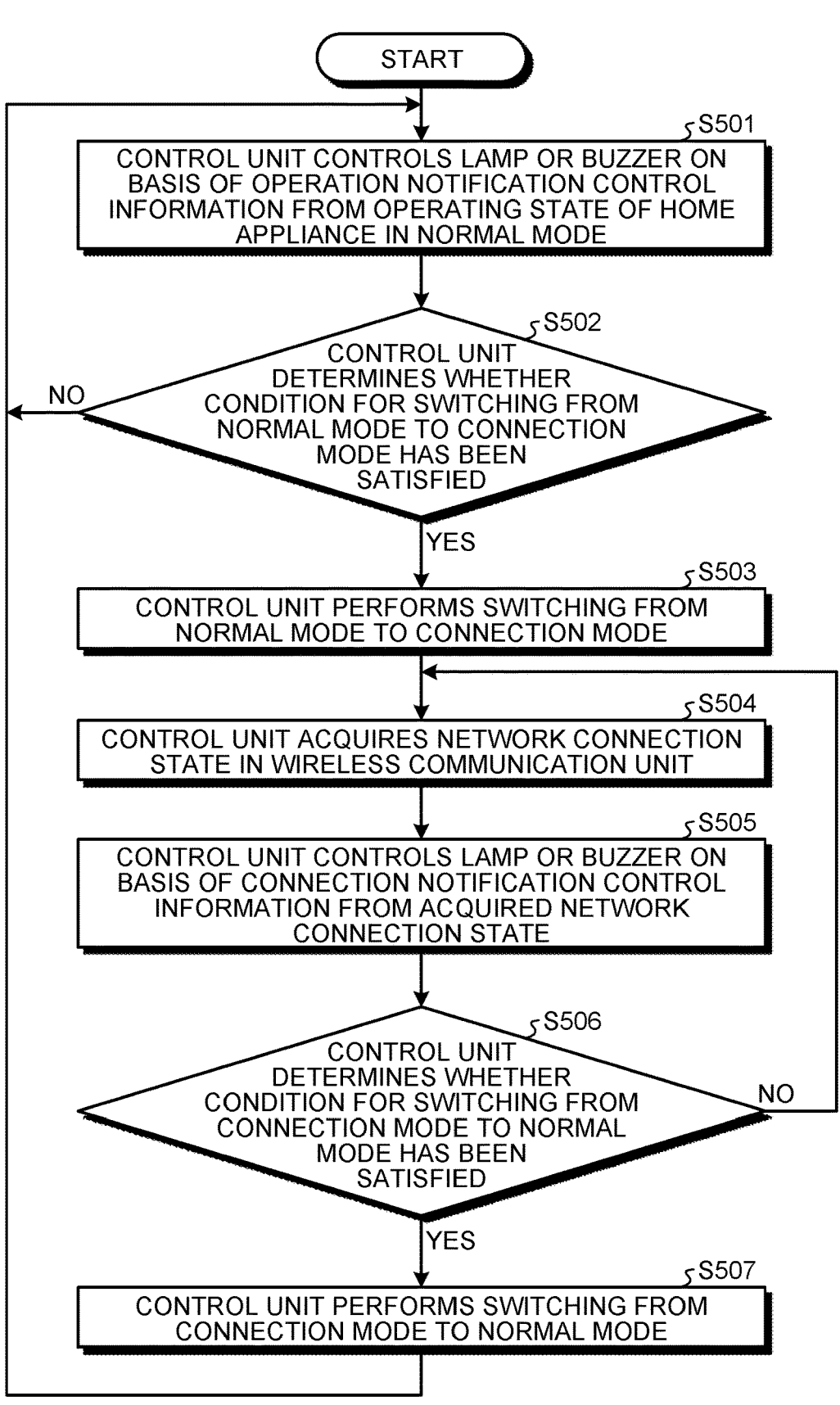
FIG. 5 is a flowchart illustrating an example of a procedure of a notification control method for the home appliance according to the first embodiment.

Next, operations of the control units 14A, 14B, and 14C of the home appliances 10A, 10B, and 10C of the appliance control systems 1A, 1B, and 1C according to the first embodiment will be described. FIG. 5 is a flowchart illustrating an example of a procedure of a notification control method for the home appliance according to the first embodiment. Hereinafter, in a case where the home appliances 10A, 10B, and 10C are not distinguished from each other, each thereof is denoted as a home appliance 10. In a case where the lamps 11A, 11B, 12B, and 11C are not distinguished from each other, each thereof is denoted as a lamp 11 or 12, in a case where the buzzers 13A, 13B, and 13C are not distinguished from each other, each thereof is denoted as a buzzer 13, and in a case where the control units 14A, 14B, and 14C are not distinguished from each other, each thereof is denoted as a control unit 14. In a case where the remote controllers 20A, 20B, and 20C are not distinguished from each other, each thereof is denoted as a remote controller 20. In addition, the wireless communication adapter 30 and the wireless communication modules 15B and 15C are each referred to as a wireless communication unit in the description of FIG. 5.

The control unit 14 controls the lamp 11 or 12 or the buzzer 13 on the basis of the operation notification control information from the operating state of the home appliance 10 in the normal mode (step S501). Thereafter, the control unit 14 determines whether a condition for switching from the normal mode to the connection mode has been satisfied (step S502). If the condition has not been satisfied (No in step S502), the process returns to step S501.

If the condition has been satisfied (Yes in step S502), the control unit 14 performs switching from the normal mode to the connection mode (step S503). The control unit 14 acquires the network connection state in the wireless communication unit (step S504), and controls the lamp 11 or 12 or the buzzer 13 on the basis of the connection notification control information from the acquired network connection state (step S505). Thereafter, the control unit 14 determines whether a condition for switching from the connection mode to the normal mode has been satisfied (step S506).

If the condition has not been satisfied (No in step S506), the process returns to step S504. If the condition has been satisfied (Yes in step S506), the control unit 14 performs switching from the connection mode to the normal mode (step S507). Then, the process returns to step S501. Thus, the notification control method for the home appliance 10 ends.

Here, a description will be given for the contents of notifications provided by the lamps 11 and 12 in a case where switching between the normal mode and the connection mode is not performed. Assuming that the clean lamp is used as the "lamp" of the connection notification control information in FIG. 4, as the contents of notifications provided by the lamps 11 and 12, "cleaning is in operation" of the operation notification control information in FIG. 3 and "successful connection to router (step S213)" and "completed connection to server (step S223)" of the connection notification control information in FIG. 4 are all included. That is, a conflict occurs in states of operations associated with the same display of the lamps 11 and 12.

However, in the first embodiment, in the home appliance 10 including the lamp 11 or 12 or the buzzer 13, the normal mode in which a notification of the operating state of the home appliance 10 is provided, and the connection mode in which the network connection state by the wireless communication adapter 30 externally attached to the home appliance 10A or the wireless communication modules 15B and 15C respectively incorporated in the home appliances 10B and 10C is indicated, are separated. Consequently, it is possible, even in a case where there are various types of network connection states, to notify the user of the network connection states by using the lamp 11 or 12 or the buzzer 13 without changing the configuration of the home appliance 10 as an existing home appliance and without conflicting with a notification indicating the operating state of the home appliance 10. That is, it is possible to prevent hardware for providing a notification of the network connection state from being added to the home appliance 10 as an existing home appliance. Therefore, the component cost can be reduced, and furthermore, in the configurations of the home appliances 10B and 10C respectively including the wireless communication modules 15B and 15C and the home appliance that does not include the wireless communication module 15B or 15C, configurations other than the configurations of the wireless communication modules 15B and 15C can be standardized.

Second Embodiment

In the first embodiment, the normal mode and the connection mode are separated, and a notification of the network connection state is provided by using the lamp 11 or 12 or the buzzer 13 in the connection mode. However, due to an environment, that is, a factor of failure, network connection including wireless connection to the router 40 or connection to the server device 50 via the router 40 may be disconnected. For example, use of a microwave oven results in interference with the 2.4 GHz band, and therefore, the wireless connection may be disconnected depending on channel settings between the wireless communication module 15B or 15C or the wireless communication adapter 30 and the router 40. The network connection may be disconnected due to various other factors such as wireless disconnection due to opening and closing of a door of a room in which the home appliance 10 is provided, shutdown of the server device 50 due to maintenance thereof, and a WAN cable unplugged from the router 40 or the server device 50. Therefore, if the control unit 14 controls the lamp 11 or 12 or the buzzer 13 every time the network connection is disconnected, the user may be confused. In addition, if such factors of the failure are eliminated, there is no need to perform the network settings again. Therefore, the solution by the method described in the first embodiment may not be appropriate.

In such a case, the information terminal 60 illustrated in FIG. 1 can display whether the wireless LAN is connected to the server device 50. However, in a case where the connection to the server device 50 cannot be established, since the network connection is disconnected, it is not possible in principle to determine what causes the disconnection for all the cases. Therefore, the user has to feel his/her way to identify the factor of the failure, which is a problem.

Therefore, in a second embodiment, the above-described problem is solved by providing the normal mode and a connection state check mode which is a mode in which in a case where a failure occurs in network connection, a notification of the content of the failure of the network connection is provided by using the lamp 11 or 12 or the buzzer 13. Note that the configurations of the appliance control systems 1A, 1B, and 1C according to the second embodiment are similar to those illustrated in FIG. 1 of the first embodiment. However, the control unit 14 transitions from the normal mode to the connection state check mode in a case where a predetermined condition is satisfied. In the connection state check mode, the control unit 14 provides the notification by the lamp 11 or 12 or the buzzer 13 corresponding to the network connection state in accordance with the predetermined condition. In addition, the control unit 14 transitions from the connection state check mode to the normal mode after the elapse of a predetermined period from switching to the connection state check mode, or in accordance with an instruction from the user. The predetermined condition corresponds to a first condition, and after the elapse of the predetermined period or the instruction from the user corresponds to a second condition. The connection state check mode corresponds to a second mode.

Figure 6:
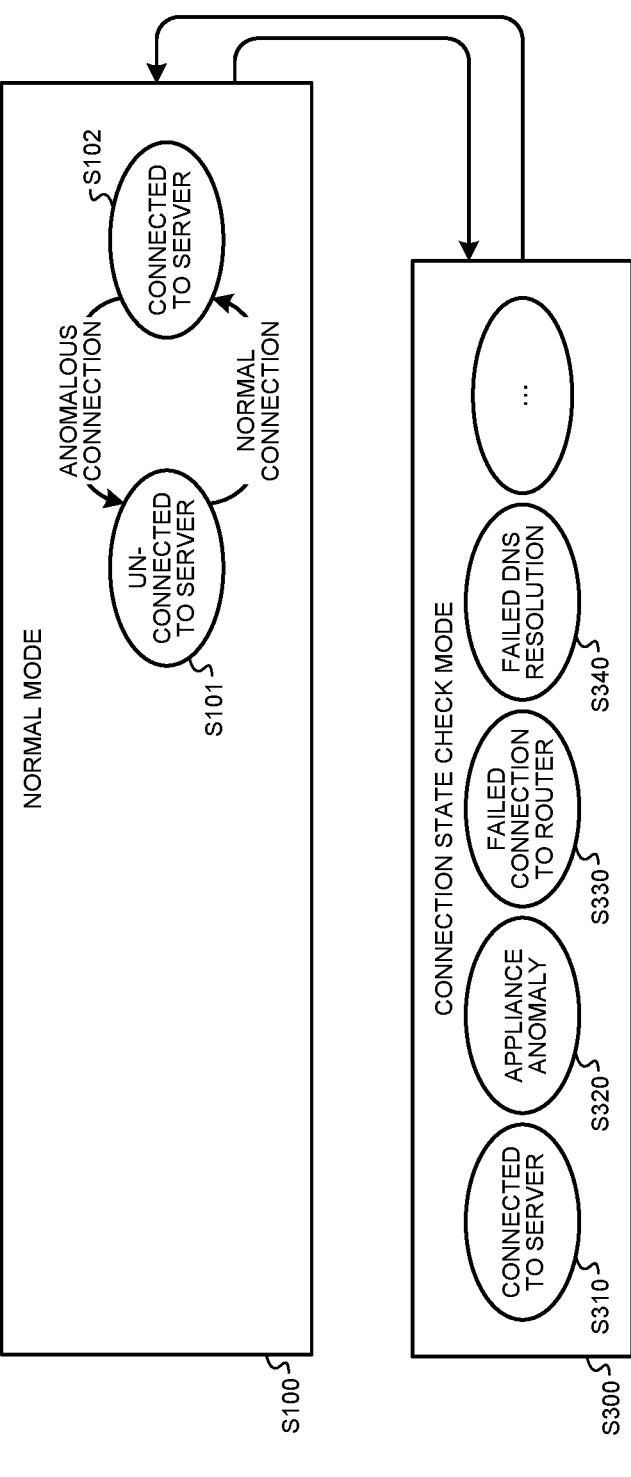
FIG. 6 is a diagram illustrating an example of state transition of the home appliance used in the appliance control system according to a second embodiment.

FIG. 6 is a diagram illustrating an example of state transition of the home appliance used in the appliance control system according to the second embodiment. Note that descriptions of the same parts as those in FIG. 2 will be omitted. In the following description, similarly to the first embodiment, the operations of the home appliance 10C and the remote controller 20C of the appliance control system 1C will be described as an example.

After network connection is completed, an anomaly may be caused in the network connection due to various factors. As described above, whether the network connection is normal or anomalous is determined by operating the information terminal 60. The details of the network connection are checked by transition from the state of the normal mode (step S100) to the state of the connection state check mode (step S300) in response to an instruction from the remote controller 20C, for example. In one example, it is possible to transition to the connection state check mode by pressing the button 24C as a predetermined button of the remote controller 20C. In that case, pressing the button 24C as a predetermined button of the remote controller 20C corresponds to a first condition.

The connection state check mode (step S300) includes a state of being connected to the server (step S310), a state of appliance anomaly (step S320), a state of failed connection to the router (step S330), and a state of failed DNS resolution (step S340). These states indicate factors of the failure of the network connection. These factors of the failure are obtained in a process in which the wireless communication module 15C is connected to the wireless LAN and connected to the server device 50, and the control unit 14C is notified of these factors of the failure. That is, the control unit 14C acquires the factors of the failure from the wireless communication module 15C, and controls notification using the lamp 11C or the buzzer 13C in association with the acquired factors of the failure. Note that as a condition for returning from the connection state check mode (step S300) to the normal mode (step S100), any of the followings may be employed: a case where a certain period of time has elapsed from the transition to the connection state check mode (step S300), and an instruction given from the remote controller 20C by operating the remote controller 20C again to perform transition to the state of the normal mode (step S100).

FIG. 7 is a diagram illustrating an example of state check notification control information of the lamp or the buzzer used in the connection state check mode in the home appliance of the appliance control system according to the second embodiment. As illustrated in FIG. 7, the state check notification control information is information defining how the lamp 11C or the buzzer 13C is operated with respect to the network connection state of the wireless communication module 15C. In FIG. 7, an item of "state" indicates each of the states in the connection state check mode of step S300 of FIG. 6, an item of "lamp" indicates how the lamp 11C of the home appliance 10C is controlled, and an item of "beeping sound" indicates how the buzzer 13C of the home appliance 10C is controlled.

Similarly to the first embodiment, in the connection state check mode, that is, by limiting the period, a conflict with an existing function that is not related to the network connection can be avoided. As a result, it is possible to make a determination on details of malfunction of the network connection. In addition, similarly to the first embodiment, by combining the lamp 11C and the buzzer 13C, it is possible to more clearly determine the factors of the failure of the network connection in the connection state check mode.

In the above description, the case has been described where regarding the appliance control system 1C of FIG. 1, the normal mode and the connection state check mode are provided and separated depending on conditions. However, also regarding the appliance control systems 1A and 1B of FIG. 1, the normal mode and the connection state check mode can be provided and separated depending on conditions. In addition, in the case of the remote controller 20B capable of bidirectional communication as in the appliance control system 1B, each of the states of the connection state check mode may be displayed on the remote controller 20B.

In the above, the example has been described in which the mode is switched to the connection state check mode in the case where a predetermined operation is performed by the remote controller 20. However, the mode may be switched to the connection state check mode under other conditions. In one example, the condition for the switching to the connection state check mode may be a time when the clean lamp is not used, or a time when the operation is stopped. This makes it easier for the user to understand.

Figure 8:
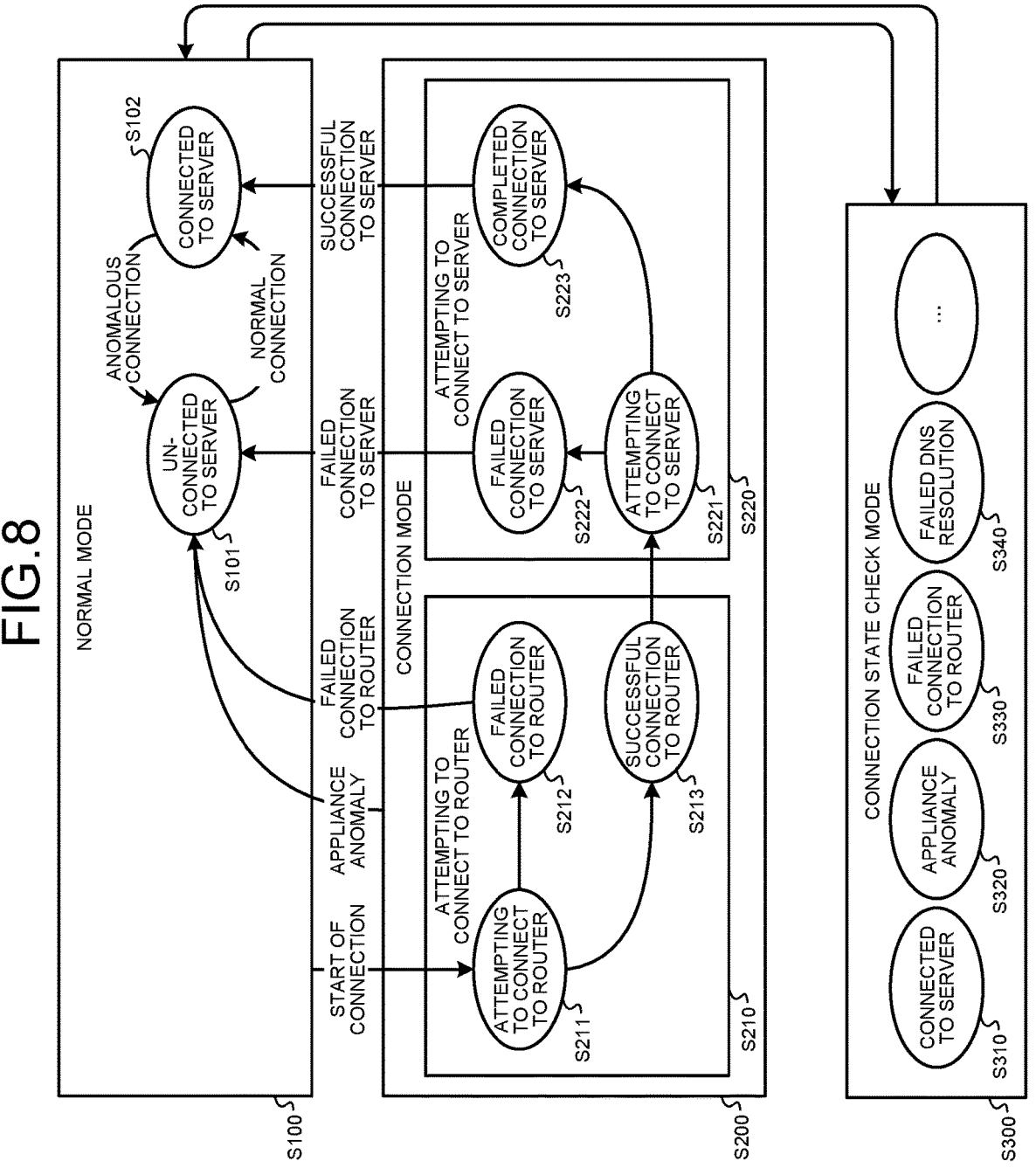
FIG. 8 is a diagram illustrating an example of state transition of the home appliance used in the appliance control system according to the second embodiment.

Note that by combining the first embodiment and the second embodiment and performing switching between the normal mode, the connection mode, and the connection state check mode, the lamp 11 or 12 or the buzzer 13 of the home appliance 10 may be caused to provide a notification of the states in the respective modes. FIG. 8 is a diagram illustrating an example of state transition of the home appliance used in the appliance control system according to the second embodiment. FIG. 8 is a combination of FIG. 2 and FIG. 6. That is, in the home appliance 10, the normal mode (step S100), the connection mode (step S200), and the connection state check mode (step S300) are provided for the notification by the lamp 11 or 12 or the buzzer 13. Consequently, regarding the notification of the operating state of the home appliance 10 in the normal mode (step S100), the notification of the network connection state in the connection mode (step S200), and the notification of the factors of the failure of the network connection in the connection state check mode (step S300), it is possible to notify the user thereof by the lamp 11 or 12 or the buzzer 13 without a conflict.

In addition, in a case where the functions described in the first and second embodiments are applied to the home appliance 10 that does not include the wireless communication module 15B or 15C, it is possible to standardize the specification by not performing the transition to the connection mode or the connection state check mode. That is, the control unit 14 determines whether the wireless communication module 15B or 15C is included, and if the wireless communication module 15B or is not included, the control unit 14 prevents the transition to the connection mode or the connection state check mode. In a case where the transition is not performed, the control unit 14 may clearly indicate to the user by the lamp 11 or 12 or the buzzer 13 that the wireless communication module 15B or 15C is not included. In addition, the control unit 14 may prompt, by the lamp 11 or 12 or the buzzer 13, the user to retrofit the wireless communication adapter 30. In a case where the wireless communication adapter 30 is added, the notification of the state of the connection mode described in the first embodiment or that of the connection state check mode described in the second embodiment can be provided by using the lamp 11 or 12 or the buzzer 13 of the home appliance 10. Also in that case, the control unit 14 determines whether the wireless communication adapter 30 is included, and if the wireless communication adapter 30 is not included, the control unit 14 prevents the transition to the connection mode or the connection state check mode.

In the second embodiment, in the home appliance including the lamp 11 or 12 or the buzzer 13, the normal mode in which a notification of the operating state of the home appliance 10 is provided, and the connection state check mode in which a notification of the factors of the failure of the network connection of the wireless communication unit including the wireless communication adapter 30 externally attached to the home appliance 10 or the wireless communication module 15B or 15C incorporated in the home appliance 10 is provided, are separated. Consequently, it is possible, even in a case where there are various types of factors of failure of the network connection, to notify the user of the factors of the failure of the network connection by using the lamp 11 or 12 or the buzzer 13 without changing the configuration of the home appliance 10 as an existing home appliance and without conflicting with a notification indicating the operating state of the home appliance 10.

Figure 9:
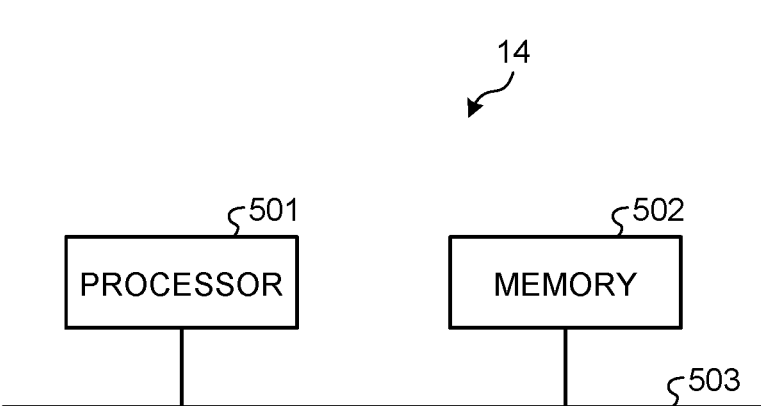
FIG. 9 is a block diagram schematically illustrating an example of a hardware configuration of a control unit included in the home appliances according to the first and second embodiments.

The control unit 14 of the first and second embodiments is implemented by processing circuitry. The processing circuitry may be dedicated hardware, or a circuit including a processor. FIG. 9 is a block diagram schematically illustrating an example of a hardware configuration of the control unit included in the home appliances according to the first and second embodiments. The control unit 14 includes a processor 501 and a memory 502. The processor 501 and the memory 502 are connected via a bus line 503. The control unit 14 is implemented by the processor 501 executing a program stored in the memory 502. A plurality of processors and a plurality of memories may cooperate to implement the above functions. A part of the functions of the control unit 14 may be implemented as an electronic circuit which is dedicated hardware, and other parts thereof may be implemented by using the processor 501 and the memory 502. In one example, in the case of the first and second embodiments, the control unit 14 controls the lamps 11 and 12 and the buzzer 13 by an electric signal.

The configurations described in the above embodiments are merely examples and can be combined with other known technology, the embodiments can be combined with each other, and part of the configurations can be omitted or modified without departing from the gist thereof.

The invention claimed is:

1. An appliance control system comprising:
a home appliance including a notification unit to provide a notification of a state by display and/or annunciating;
a wireless communication unit to enable the home appliance to be connected to a server device via a wireless network; and
a remote operation unit to enable operation settings of the home appliance and settings of network connection including connection of the wireless communication unit to the wireless network and to the server device to be performed, wherein
the home appliance includes control circuitry configured to perform operation control in accordance with an instruction of the operation settings from the remote operation unit, and control the notification unit in accordance with an operating state of the home appliance, and
the control circuitry controls the notification unit by performing switching the notification unit between
a first mode in which the notification unit provides a notification of the operating state of the home appliance, wherein the notification of the operating state is configured to indicate one of a plurality of different operation states of the home appliance which is operating, and
a second mode in which the notification unit provides a notification of information regarding the network connection, wherein the notification of the information regarding the network connection is configured to indicate a wireless communication unit connection success, a wireless communication unit connection failure, a server device connection success, and a server device connection failure, in a network connection sequence, and
the control circuitry performs switching to the second mode between a time when a predetermined first condition is satisfied in the first mode and a time when a predetermined second condition is satisfied, wherein
the predetermined first condition is a time when the wireless communication unit starts pairing and
the predetermined second condition is a time when the connection to the server device is completed or fails.

2. The appliance control system according to claim 1, wherein
the information regarding the network connection is a network connection state that indicates a state when the wireless communication unit is connected to the wireless network and the server device, and
the second mode is a connection mode in which the notification unit provides a notification of the network connection state.

3. The appliance control system according to claim 2, wherein
the information regarding the network connection further includes information indicating a factor of failure of the network connection,
the second mode further includes a connection state check mode in which the notification unit provides a notification of the factor of the failure of the network connection, and
the control circuitry controls the notification unit by performing switching between the first mode, the connection mode, and the connection state check mode.

4. The appliance control system according to claim 1, wherein
the information regarding the network connection is information indicating a factor of failure of the network connection, and
the second mode is a connection state check mode in which the notification unit provides a notification of the factor of the failure of the network connection.

5. The appliance control system according to claim 1, wherein the wireless communication unit is incorporated in the home appliance.

6. The appliance control system according to claim 1, wherein the wireless communication unit is external and connected to the home appliance via a cable.

7. The appliance control system according to claim 1, wherein the notification unit includes at least one lamp display and at least one auditory alert, and
wherein the notification unit provides the notification of the operating state and of the information regarding the network connection as corresponding to a content of the at least one lamp display and/or the at least one auditory alert.

8. The appliance control system according to claim 7, wherein the at least one lamp display indicates different content of the notification of the operating state as corresponding to different predetermined colors.

9. The appliance control system according to claim 7, wherein the at least one auditory alert indicates different content of the information regarding the network connection as corresponding to different predetermined patterns of a beeping sound.

10. A home appliance comprising:

a notification unit to provide a notification of a state by display and/or annunciating, control circuitry configured to perform operation control in accordance with an instruction of operation settings from a remote operation unit that enables the operation settings of the home appliance to be performed, and control the notification unit in accordance with an operating state of the home appliance, wherein the control circuitry controls the notification unit by performing switching the notification unit between a first mode in which the notification unit provides a notification of the operating state of the home appliance, wherein the notification of the operating state is configured to indicate one of a plurality of different operation states of the home appliance which is operating, and a second mode in which the notification unit provides a notification of information regarding network connection including connection of a wireless communication unit to a wireless network and to a server device, the wireless communication unit enabling the home appliance to be connected to the server device via the wireless network, wherein the notification of the information regarding the network connection is configured to indicate a wireless communication unit connection success, a wireless communication unit connection failure, a server device connection success, and a server device connection failure, in a network connection sequence, and the control circuitry, in response to receiving, from the remote operation unit, an instruction of settings of the network connection, performs switching to the second mode between a time when a predetermined first condition is satisfied in the first mode and a time when a predetermined second condition is satisfied, wherein the predetermined first condition is a time when the wireless communication unit starts pairing and the predetermined second condition is a time when the connection to the server device is completed or fails.

11. The home appliance according to claim 10, wherein the notification unit includes at least one lamp display and at least one auditory alert, and wherein the notification unit provides the notification of the operating state and of the information regarding the network connection as corresponding to a content of the at least one lamp display and/or the at least one auditory alert.

12. The home appliance according to claim 11, wherein the at least one lamp display indicates different content of the notification of the operating state as corresponding to different predetermined colors.

13. The home appliance according to claim 11, wherein the at least one auditory alert indicates different content of the information regarding the network connection as corresponding to different predetermined patterns of a beeping sound.

14. A notification control method for a home appliance in an appliance control system, the appliance control system including:

a home appliance including a notification unit to provide a notification of a state by display and/or annunciating and control circuitry;

a wireless communication unit to enable the home appliance to be connected to a server device via a wireless network; and a remote operation unit to enable operation settings of the home appliance and settings of network connection including connection of the wireless communication unit to the wireless network and to the server device to be performed, the notification control method for the home appliance, comprising:

performing operation control in accordance with an instruction of the operation settings from the remote operation unit, and controlling the notification unit in accordance with an operating state of the home appliance in a first mode in which the notification unit provides a notification of the operating state of the home appliance, wherein the notification of the operating state is configured to indicate one of a plurality of different operation states of the home appliance which is operating; and controlling the notification unit by performing switching between the first mode and a second mode in which the notification unit provides a notification of information regarding the network connection, wherein the notification of the information regarding the network connection is configured to indicate a wireless communication unit connection success, a wireless communication unit connection failure, a server device connection success, and a server device connection failure, in a network connection sequence, wherein switching to the second mode is performed between a time when a predetermined first condition is satisfied in the first mode and a time when a predetermined second condition is satisfied, wherein the predetermined first condition is a time when the wireless communication unit starts pairing and the predetermined second condition is a time when the connection to the server device is completed or fails.

15. The notification control method according to claim 14, wherein the notification unit includes at least one lamp display and at least one auditory alert, and wherein the notification unit provides the notification of the operating state and of the information regarding the network connection as corresponding to a content of the at least one lamp display and/or the at least one auditory alert.

16. The notification control method according to claim 15, wherein the at least one lamp display indicates different content of the notification of the operating state as corresponding to different predetermined colors.

17. The notification control method according to claim 15, wherein the at least one auditory alert indicates different content of the information regarding the network connection as corresponding to different predetermined patterns of a beeping sound.

* * * * *